United States Patent [19]

Yamakawa et al.

[11] Patent Number: 5,165,981

[45] Date of Patent: Nov. 24, 1992

[54] CERAMIC SUBSTRATE AND PREPARATION OF THE SAME

[75] Inventors: Akira Yamakawa; Tadashi Igarashi, both of Itami, Japan

[73] Assignee: Sumitomo Electric Industries, Ltd., Osaka, Japan

[21] Appl. No.: 746,093

[22] Filed: Aug. 12, 1991

Related U.S. Application Data

[63] Continuation of Ser. No. 644,738, Jan. 23, 1991, abandoned, which is a continuation of Ser. No. 170,353, Mar. 18, 1988, abandoned.

[30] Foreign Application Priority Data

Mar. 20, 1987 [JP] Japan .................. 62-66989

[51] Int. Cl.$^5$ ................................ G11B 5/14
[52] U.S. Cl. .................... 428/141; 428/212; 428/217; 428/334; 428/336; 428/693; 428/698; 428/699; 428/701; 360/103; 360/122
[58] Field of Search ............... 428/698, 699, 701, 702, 428/336, 141, 693, 334, 217, 212, 704; 360/103, 122

[56] References Cited

U.S. PATENT DOCUMENTS

| | | | |
|---|---|---|---|
| 3,953,636 | 4/1976 | Kirchner | 428/698 X |
| 4,069,360 | 1/1978 | Yanagisawa et al. | 428/64 |
| 4,312,899 | 1/1982 | Lahmann | 428/698 X |
| 4,336,305 | 6/1982 | Tanaka | 428/698 X |
| 4,414,270 | 11/1983 | Miyoshi et al. | 428/329 |
| 4,463,062 | 7/1984 | Hale | 428/701 X |
| 4,474,849 | 10/1984 | Fujimori et al. | 428/698 |
| 4,528,212 | 7/1985 | Cairns et al. | 428/701 |
| 4,582,812 | 4/1986 | Furukawa et al. | 360/103 X |
| 4,595,665 | 6/1986 | Takayama et al. | 428/701 X |
| 4,659,606 | 4/1987 | Wada et al. | 428/900 |
| 4,660,114 | 4/1987 | Yamakawa et al. | 360/103 |
| 4,681,813 | 7/1987 | Yamada et al. | 428/698 X |
| 4,690,846 | 9/1987 | Wada et al. | 428/432 |
| 4,808,463 | 2/1989 | Yoshikatsu et al. | 428/698 |
| 4,863,658 | 9/1989 | Sugiura et al. | 264/65 |

FOREIGN PATENT DOCUMENTS

| | | |
|---|---|---|
| 0013363 | 7/1980 | European Pat. Off. . |
| 0108940 | 5/1984 | European Pat. Off. . |
| 0153141 | 8/1985 | European Pat. Off. . |
| 0048752 | 5/1978 | Japan .................. 428/701 |

OTHER PUBLICATIONS

J. M. Blocher, Jr., et al., "Chemical Vapor Deposition", Proceedings of the Conference on Chemical Vapor Deposition, Fifth International Conference, 1975, pp. ix-xiii and 485-494.

*Primary Examiner*—Ellis P. Robinson
*Assistant Examiner*—Archene Turner
*Attorney, Agent, or Firm*—Cushman, Darby & Cushman

[57] ABSTRACT

A ceramic substrate which comprises a ceramic base material having porosity of not more than 5% and surface roughness $R_{max}$ of not larger than 0.1 μm, and an amorphous aluminum oxide film having thickness of 1 to 50 μm formed on a surface of said ceramic base material, has high reliability and can be easily surface finished with high accuracy and can be used to form a thin film magnetic circuit.

4 Claims, No Drawings

CERAMIC SUBSTRATE AND PREPARATION OF THE SAME

This is a continuation of application Ser. No. 07/644,738 filed on Jan. 23, 1991, now abandoned, which is a file-wrapper-continuation of Ser. No. 07/170,353 filed Mar. 18, 1988, now abandoned.

BACKGROUND OF THE INVENTION

1. Field of the Invention

The present invention relates to a dense ceramic substrate having good workability and mechanical properties.

2. Description of the Related Arts

A ceramic substrate is used widely, for example, as an insulation substrate for integrated circuits, since it has good insulation property and chemical stability. Recently, a thin film magnetic head which is used in a magnetic disk instrument is produced by forming a magnetic circuit on the ceramic substrate.

For example, when the ceramic substrate is used as a substrate of the thin film magnetic head as described in U.S. Pat. No. 4,660,114, its surface must be very smooth to such extent that surface roughness $R_{max}$ is about 0.02 $\mu$m so as to form the magnetic circuit. To this end, a dense ceramic base material which comprises aluminum oxide ($Al_2O_3$) and the like as a main component is polished to surface roughness $R_{max}$ of about 0.02 $\mu$m and coated with a ceramic film such as $Al_2O_3$ or $SiO_2$ so as to prepare a substrate, which is used to form a thin film magnetic circuit.

However, even if the surface of the ceramic base material is polished to the surface roughness $R_{max}$ of not larger than about 0.02 $\mu$m, the surface smoothness of the base material has poor reliability and the ceramic film formed on the base material often has poor surface accuracy due to contamination of debris and presence of voids. In addition, the ceramic film cannot be surface finished sufficiently for this use because it cannot be easily machined and tends to suffer from peeling and faults during polishing. Therefore, the ceramic substrate cannot maintain the surface accuracy of the polished ceramic base material and can hardly be used to form the magnetic circuit having desired properties.

SUMMARY OF THE INVENTION

An object of the present invention is to provide a ceramic substrate which can be easily surface finished with desired surface accuracy for a thin film magnetic head and has high reliability.

The above and other objects of the present invention are achieved by a ceramic substrate which comprises a ceramic base material having porosity of not more than 5% and surface roughness $R_{max}$ of not larger than 0.1 $\mu$m and an amorphous aluminum oxide film having thickness of 1 to 50 $\mu$m formed on a surface of said ceramic base material.

The ceramic substrate according to the present invention can be produced by a method which comprises a step of machining a surface of a ceramic base material having porosity of not more than 5% such that the ceramic base material has surface roughness $R_{max}$ of not larger than 0.1 $\mu$m, and a step of forming, on the surface of the ceramic base material, an amorphous aluminum oxide film having thickness of 1 to 50 $\mu$m by physical deposition which comprises depositing a vaporized material in plasma state.

DETAILED DESCRIPTION OF THE INVENTION

Preferably, the ceramic base material comprises at least one selected from the group consisting of $Al_2O_3$, $ZrO_2$, $SiO_2$, $SiC$, $Si_3N_4$ and $AlN_4$ as a main component. More preferably, it is a densely sintered TiC-containing $Al_2O_3$ or TiC-containing TZP (tetragonal zirconia polycrystal). A conventional procedure such as polishing or lapping can be used to surface finish the ceramic base material to the surface roughness $R_{max}$ of not larger than 0.1 $\mu$m.

The ceramic base material has a porosity of not more than 5%. When the porosity is more than 5%, the base material has insufficient denseness to achieve the surface roughness of $R_{max}$ of not larger than 0.1 $\mu$m. When the surface roughness $R_{max}$ is larger than 0.1 $\mu$m, the surface condition of the ceramic base material significantly influences the condition of the amorphous aluminum oxide film and the smooth amorphous aluminum oxide film suitable for the magnetic circuit can be hardly formed by the subsequent surface finishing.

When usual ceramic films are used as the film formed on the ceramic base material, they cannot easily surface finished due to their high hardness as described above. When the amorphous aluminum oxide film is used according to the present invention, it has the same smooth surface as the base material due to uniform nucleation and it can be easily and accurately surface finished to surface roughness $R_{max}$ of not larger than 0.02 $\mu$m due to its softness. Preferably, hardness (Vickers hardness) of the amorphous aluminum oxide film is controlled to not larger than 1,000 $kg/mm^2$, since surface finishing is easily carried out.

The amorphous aluminum oxide film is not necessarily a stoichiometric $Al_2O_3$ and it may contain oxygen defect and contaminant elements. The term "amorphous" used herein does not mean that no crystalline phase is contained, but the amorphous aluminum oxide film may contain a small amount of the crystalline phase, for example, which can not be identified by an X-ray analysis. The amorphous aluminum oxide film can be prepared by a physical deposition method which comprises depositing vaporized material, such as spattering, ion plating or plasma CVD. The ion plating method in which the film is quickly formed is particularly preferable. The physical deposition method using the plasma phase is preferable, since the film can be formed at a low temperature at which crystallization can be inhibited, a temperature of the substrate is selected from a wide temperature range, and the resultant amorphous aluminum oxide film has good adhesion properties. Usually, as the temperature of the substrate increases, crystallinity of the film increases and workability of the film is degraded although adhesion of the film to the substrate is improved. Therefore, the upper limit of the temperature of the substrate is such temperature that crystalline aluminum oxide is not identified by the X-ray analysis. The temperature of the substrate is preferably 100° to 500° C.

Although the amorphous aluminum oxide film can be surface finished by a conventional polishing or lapping, it is difficult to obtain repeatedly a fault-free film having the surface roughness $R_{max}$ of not larger than 0.02 $\mu$m. The thin amorphous aluminum oxide film having no fault and the surface roughness $R_{max}$ of not larger than 0.02 $\mu$m to be required for the thin film magnetic head can be obtained, when a surface of a work piece is machined by an EEM (Elastic Emission Machining) method in which the surface of the work piece is machined by flowing slurry comprising abrasive grains without contacting the work piece with a rotating lapping tool in the slurry (cf. Mori and Yamauchi, The Journal of the Japan Precision Engineering Society, 51 [1], 12 (1985)). As the abrasive grains, used are fine powder comprising the compound selected from the group consisting of silicon oxide, aluminum oxide, silicon carbide, diamond, cubic system boron nitride and the like. Particle diameter of the abrasive grains is smaller than desired surface roughness.

The amorphous aluminum oxide film has the thickness of 1 to 50 $\mu$m. When the thickness is smaller than 1 $\mu$m, the surface finishing is difficult and the film tends to contain faults. When the thickness is larger than 50 $\mu$m, strain in the film increases and the film is expensive.

The present invention is explained by following examples.

EXAMPLES 1 to 11

Each base material comprising ceramic sintered body having ingredients shown in Table and the porosity of not more than 1% was polished to surface roughness $R_{max}$ of 0.05) a diamond paste. The base material had a diameter of 75 mm and a thickness of 4 mm. Then an amorphous aluminum oxide film was formed on a surface of each base material by a procedure shown in Table. The amorphous aluminum oxide film was formed at a substrate temperature of 300° C. in an oxygen atmosphere of $5 \times 10^{-4}$ Torr by an ion plating method using a vapor source of Al$_2$O$_3$ and CVD method.

Each resultant amorphous aluminum oxide film was surface finished according to the EEM method by abrasing the film so as to reduce its thickness by 1 $\mu$m in slurry which comprised a dispersion of SiO$_2$ powder of an average particle size of 0.01 $\mu$m and was flowed by rotation of a lapping tool. The thickness ($\mu$m) and surface roughness $R_{max}$ (Å) of each amorphous aluminum oxide are shown in Table.

TABLE

| Ex. No. | Base Material | Film type (Procedure) | | Thickness of Film | Surface Roughness |
|---|---|---|---|---|---|
| 1* | TZP-45TiC | Crystalline | (CVD) | 10 μm | 1,000 Å |
| 2* | ↑ | ↑ | (↑) | 20 μm | 1,000 Å |
| 3 | ↑ | Amorphous | (Ion Plating) | 20 μm | 30 Å |
| 4 | ↑ | ↑ | (↑) | 30 μm | 35 Å |
| 5* | ↑ | ↑ | (↑) | 55 μm | 600 Å |
| 6 | Al$_2$O$_3$-30TiC | ↑ | (↑) | 10 μm | 35 Å |
| 7 | Si$_3$N$_4$ | ↑ | (↑) | 10 μm | 35 Å |

TABLE-continued

| Ex. No. | Base Material | Film type (Procedure) | | Thickness of Film | Surface Roughness |
|---|---|---|---|---|---|
| 8 | SiC | ↑ | (↑) | 10 μm | 40 Å |
| 9* | TZP-45TiC | None | (↑) | — | 350 Å |
| 10* | ↑ | Amorphous | (↑) | 0.5 μm | 250 Å |
| 11 | AlN | ↑ | (↑) | 10 μm | 35 Å |

Note: *) Examples 1, 2, 5, 9 and 10 are Comparative Examples.

Each resultant substrate in Examples according to the present invention has good surface accuracy. In contrast, when no amorphous aluminum oxide film is present (Example 9), the thickness of the amorphous aluminum oxide film is larger than 50 $\mu$m (Example 5) and the thickness of the amorphous aluminum oxide film is smaller than 1 $\mu$m (Example 10), the surface roughness $R_{max}$ is larger than 0.02 $\mu$m and the substrate is not suitable for the ceramic substrate for the thin film magnetic head. When the aluminum oxide film is crystalline (Examples 1 and 2), the surface finishing is difficult and the required surface accuracy cannot be obtained due to, for example, peeling of the film.

EXAMPLE 12

On the substrate obtained in Example 6, an Al conductor thin film was formed by spattering. Then, a main magnetic pole comprising a permalloy thin film was formed by spattering to prepare a one turn head. The Al conductor film and the permalloy film were firmly adhered to the substrate, and the head had good magnetic properties.

What is claimed is:

1. A ceramic substrate that comprises a ceramic base material selected from the group consisting of ZrO$_2$, SiO$_2$, SiC, Si$_3$N$_4$ and AlN and having a porosity of not more than 5% and a surface roughness $R_{max}$ not larger than 0.1 $\mu$m and an amorphous aluminum oxide film having a thickness in the range of from 1 to 50 $\mu$m and a hardness less than 800 kg/mm$^2$ formed directly on a surface of said ceramic base material.

2. A ceramic substrate as claimed in claim 1, wherein said aluminum oxide film has a surface roughness of 0.02 $\mu$m.

3. A ceramic substrate that comprises a ceramic base material selected from the group consisting of ZrO$_2$, SiO$_2$, SiC, Si$_3$N$_4$ and AlN and having a porosity of not more than 5% and a surface roughness $R_{max}$ not larger than 0.1 $\mu$m and an amorphous aluminum oxide film having a thickness in the range of from 1 to 50 $\mu$m and a hardness less than 1000 kg/mm$^2$ formed directly on a surface of said ceramic base material.

4. A ceramic substrate as claimed in claim 3, wherein said aluminum oxide film has a surface roughness of 0.02 $\mu$m.

* * * * *